United States Patent
Chen et al.

(10) Patent No.: US 7,565,622 B2
(45) Date of Patent: Jul. 21, 2009

(54) METHOD AND APPARATUS FOR MODIFICATION OF POINTING DEVICE FUNCTIONS IN CONJUNCTION WITH DYNAMIC SORTING, DISPLAYING, LISTING, AND ACTIVATION

(75) Inventors: Yen-Fu Chen, Austin, TX (US); Raymond Tang Wang, Austin, TX (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 926 days.

(21) Appl. No.: 10/617,529

(22) Filed: Jul. 10, 2003

(65) Prior Publication Data

US 2005/0010594 A1    Jan. 13, 2005

(51) Int. Cl.
    *G06F 3/048* (2006.01)
(52) U.S. Cl. .......... 715/810; 715/856
(58) Field of Classification Search .......... 715/810, 715/811, 856
    See application file for complete search history.

(56) References Cited

U.S. PATENT DOCUMENTS

| | | | |
|---|---|---|---|
| 5,276,797 A | 1/1994 | Bateman et al. | 395/161 |
| 5,530,796 A | 6/1996 | Wang | 395/156 |
| 5,594,847 A | 1/1997 | Moursund | 395/133 |
| 5,612,719 A * | 3/1997 | Beernink et al. | 345/173 |
| 5,664,210 A | 9/1997 | Fleming et al. | 395/793 |
| 5,781,193 A | 7/1998 | Alimpich et al. | 345/352 |
| 5,828,376 A | 10/1998 | Solimene et al. | 395/352 |
| 5,867,162 A | 2/1999 | O'Leary et al. | 345/352 |
| 5,917,491 A * | 6/1999 | Bauersfeld | 715/810 |
| 5,930,813 A | 7/1999 | Padgett et al. | 707/539 |
| 5,982,370 A | 11/1999 | Kamper | 345/356 |
| 5,990,893 A * | 11/1999 | Numazaki | 715/863 |
| 6,160,555 A | 12/2000 | Kang et al. | 345/358 |
| 6,208,340 B1 | 3/2001 | Amin et al. | 345/339 |
| 6,240,430 B1 | 5/2001 | Deike et al. | 707/539 |
| 6,249,606 B1 * | 6/2001 | Kiraly et al. | 382/195 |
| 6,397,228 B1 | 5/2002 | Lamburt et al. | 707/203 |
| 6,434,568 B1 | 8/2002 | Bowman-Amuah | 707/103 |
| 7,246,329 B1 * | 7/2007 | Miura et al. | 715/810 |
| 2002/0194111 A1 * | 12/2002 | Young | 705/37 |

FOREIGN PATENT DOCUMENTS

EP    0540445 A1    9/1992

(Continued)

*Primary Examiner*—Thanh T Vu
(74) *Attorney, Agent, or Firm*—Yee & Associates, P.C.; Carlos Munoz-Bustamante

(57) ABSTRACT

An Operation Modification Program is disclosed that alters the functions performed with a user input device in conjunction with a Drop Down Menu Program. The Drop Down Menu Program provides for the elimination of some manual steps required by a user when employing a user input device for operations involving activation, selection, sorting and scrolling. The Operation Modification Program provides for modification of pointer device functions to eliminate additional manual steps that would be required by a user with the Drop Down Menu Program. The user may configure the modifications or the user may operate using default settings. Five modifications are provided: pointer-over, pointer-over-with-highlighting, pointer-over-with-clicking, pointer-over-with highlighting-and-clicking, and pointer-movement. The five modifications provide for auto-detection, auto-determination, and auto-execution thereby eliminating one or more manual movements by a user. Each of the five modifications can be applied in the areas of activation, selection, scrolling and sorting.

36 Claims, 9 Drawing Sheets

FOREIGN PATENT DOCUMENTS

| | | |
|---|---|---|
| JP | 03-282934 | 12/1991 |
| JP | 09-073355 | 3/1997 |
| JP | 09-305366 | 11/1997 |
| JP | 09288557 | 11/1997 |
| JP | 11-065800 | 3/1999 |
| JP | 2000-010769 | 1/2000 |
| JP | 2000181598 | 6/2000 |
| JP | 2001092584 | 4/2001 |
| JP | 2001109553 | 4/2001 |
| JP | 2002-032182 | 1/2002 |

* cited by examiner

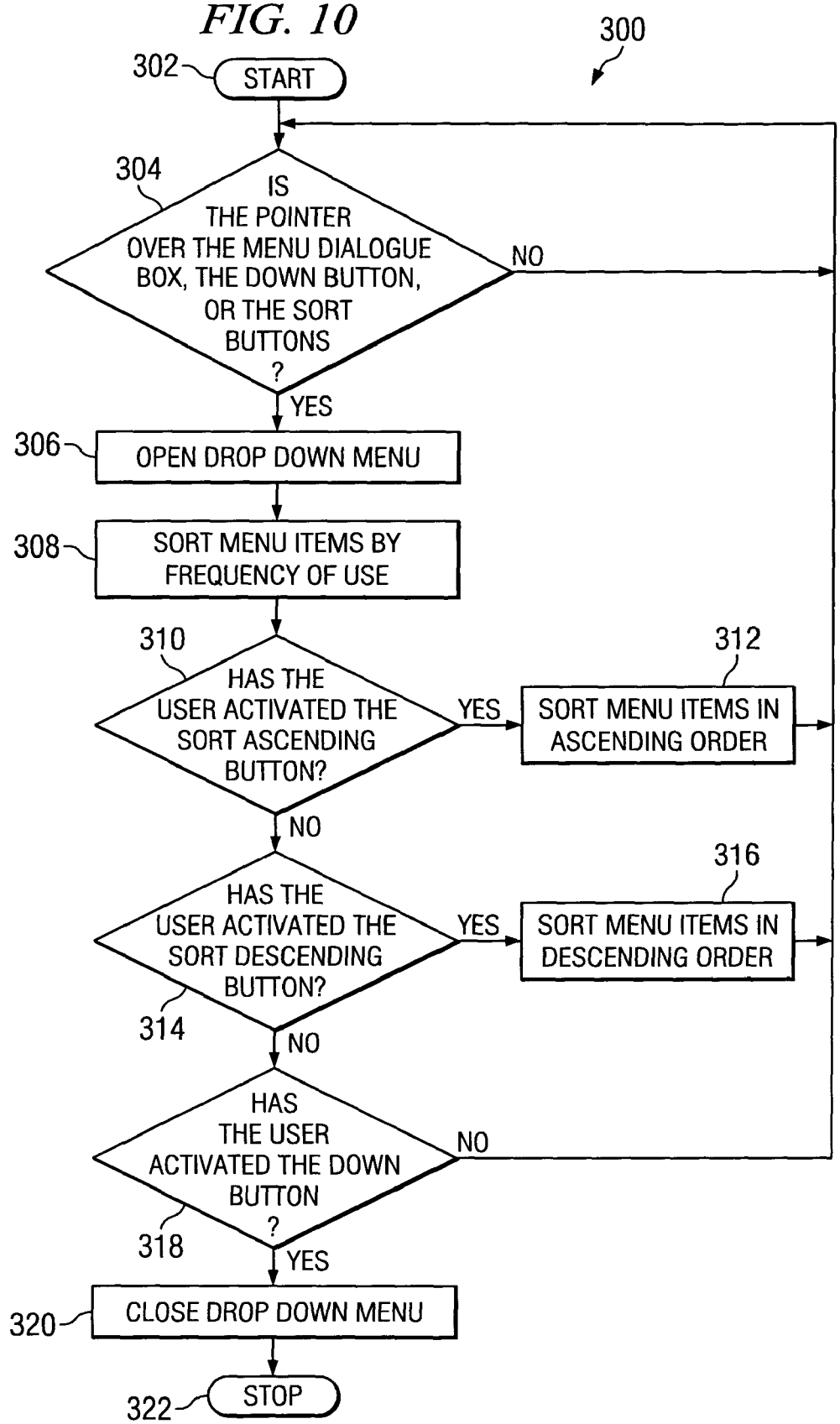

*FIG. 15*
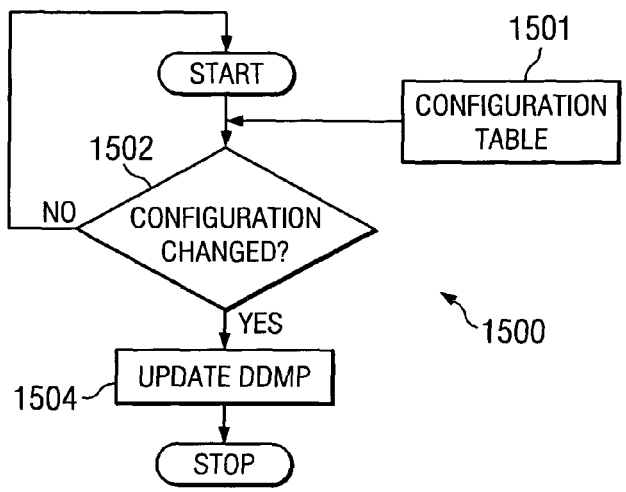
*FIG. 16*
| POINTER OPERATION | OPERATION MODE |
|---|---|
| ACTIVATING | POINTER-OVER |
| SELECTING | POINTER-OVER |
| SCROLLING | POINTER-OVER |
| SORTING | POINTER-OVER-WITH-CLICKING |
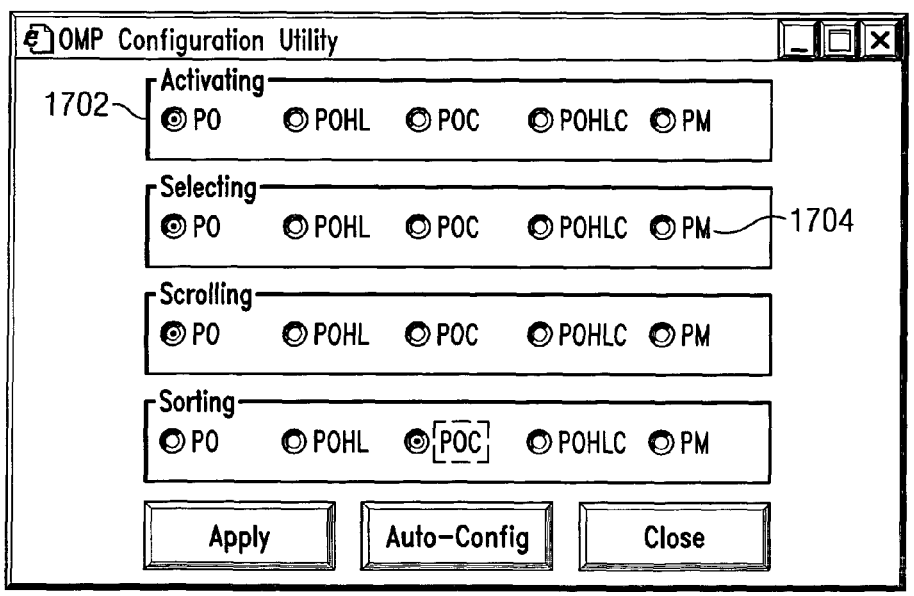
*FIG. 17*

METHOD AND APPARATUS FOR MODIFICATION OF POINTING DEVICE FUNCTIONS IN CONJUNCTION WITH DYNAMIC SORTING, DISPLAYING, LISTING, AND ACTIVATION

FIELD OF THE INVENTION

The present invention is related to improvements in the manipulation of data on a graphical user interface. Specifically, the present invention is a configurable method of modifying pointing device functions to automate manual steps required by the user when engaged in activating, selecting, scrolling and sorting functions.

RELATED APPLICATIONS

This application is related to U.S. patent application Ser. Nos. 10/427,301, 10/427,378 and 10/427,279.

BACKGROUND OF THE INVENTION

Web pages viewable over the Internet are well known in the art. Some web pages provide users with information without user interaction. However, the vast majority of web pages are user interactive with the web page designed to extract information from the user. For example, most business web pages are interactive in nature allowing the user to view, select, and purchase goods and services directly off of the web page.

An important tool used by web page designers to extract information from the users is a drop down menu. Drop down menus for web pages and computer applications are well known in the art. A drop down menu is hidden until the user clicks on a down button to open a list from which the user can select the applicable menu item. The user may then close the drop down menu by clicking the down button a second time. FIG. 1 is an illustration of a typical prior art drop down menu. The drop down menu contains dialogue box 22 and down button 24. The user clicks down button 24 and a list of available menu items appears on menu 26. The user can then highlight desired menu item 28 and click down button 24 again to close the menu. Drop down menus of this type are used in a wide variety of different menus to present the user with a list of finite options such as, for example, email lists, account lists, lists of states or countries, or lists of different credit cards.

In some applications the number of available choices can be extensive. For example, if the menu is a list of all fifty states of the United States of America, the list would extend to the bottom of the window or off of the viewable area. One solution to the problem of extensive menu choices is to add a vertical scroll bar to menu 26. As seen in FIG. 2, vertical scroll bar 29 allows the user to browse the list of available items on menu 26 and select desired menu item 28. Desired menu item 28 remains highlighted even when the user scrolls through menu 26 and views the other menu items. Desired menu item 28 remains highlighted until the user selects a new menu item. In many embodiments, desired menu item 28 will appear in place of dialogue box 22 when down button 24 is clicked to close menu 26.

Another problem encountered when designing and using drop down menus is that the user may be required to make multiple selections from a single drop down menu. A common example of a requirement for multiple selections is when a user desires to send an email to a plurality of recipients and wants to select the recipients from a drop down menu. As seen in FIG. 3, one method for allowing a user to select multiple items is a conventional scrolling menu. The user may select menu items from the list by holding the shift or control button down while selecting each desired menu item with a pointer controlled by a user input device. A conventional menu is not preferable because it requires a large amount of space on a web page.

Furthermore, if the user is making multiple selections, the previously selected items become unselected if the user does not hold down the shift key or the control key while clicking on each of the selected menu items. Losing previous selections is a particular problem with notebook computers having a touchpad to control the pointer on the graphical user interface. Therefore, a need exists for an improved method to make multiple selections from a drop down menu.

Alternative methods for making selections from a drop down menu also include radio buttons and check boxes. FIG. 4 is an illustration of a prior art menu utilizing radio buttons. A radio button has a first circle that, when clicked on, indicates selection of the text adjacent to the radio button by displaying a second solid circle inside the first circle. Radio buttons act like the station selector buttons on a car radio. Selecting one button in a set deselects the previously selected button, so one and only one of the options in the set can be selected at any given time. In contrast, check boxes are used when more than one option in the set can be selected at the same time. FIG. 5 is an illustration of a prior art menu with check boxes. Check boxes are used to enable or disable one or more features or options from a set. When an option is selected, an x or a check-mark appears in the corresponding box. Radio buttons and check lists utilize more web page space than drop down menus and, unlike the drop down menus, continuously display all of the available menu choices. Therefore, a need exists for an improved method to select multiple menu items from a drop down menu.

Furthermore, the prior art methods of organizing information in a drop down menu are limited. The organization of menu items in a drop down menu are currently designated by the author of the web page (in the case of web pages) or by the computer programmer (in the case of computer applications). Web page authors and computer programmers almost exclusively organize drop down menu items in chronological, alphabetical, or random order which may not be useful to a user who could benefit from an organization based on a user specific criteria such as frequency of use. Therefore, a need exists for an improved method of organizing information in a drop down menu.

Moreover, it would be advantageous for users to be able to view selected menu items apart from the unselected menu items. This would facilitate easier review and revision of multiple selections from a drop down menu. Therefore, a need exists for a method to review selected menu items apart from the non-selected items on a drop down menu.

U.S. Pat. No. 5,828,376 (the '376 patent) entitled "Menu Control in a Graphical User Interface" discloses a hyperbutton used in conjunction with a menu to manipulate items on the menu. U.S. Pat. No. 5,530,796 (the '796 patent) entitled "Menu Bar Editor" discloses a direct screen manipulation technique for drop down menus. European Patent Application Publication 0 540 445 A1 (the '445 application) entitled "Method of Representing a Set of Computer Menu Selections in a Single Graphical Metaphor" discloses a method for representing drop down menu items as icons. However, the '376 patent, the '796 patent, and the '445 application do not disclose a method for improving the process of selecting, organizing, and editing menu items from a drop down menu on a graphical user interface or a computer display.

What is needed beyond the prior art is a method to provide options to a user to improve the process of selecting, organizing and editing menu items from a drop down menu. In addition, what is needed beyond the prior art is a method of modifying pointing device functions to automate manual steps required by the user when engaged in activating, selecting, scrolling and sorting functions.

SUMMARY OF THE INVENTION

The present invention, which meets the needs stated above, is an Operation Modification Program that enables a user to alter the functions performed with a user input device in conjunction with a Drop Down Menu Program. The Drop Down Menu Program provides for the elimination of some manual steps required by a user when employing a user input device for operations involving activation, selection, sorting and scrolling. The Operation Modification Program provides for modification of pointer device functions to eliminate additional manual steps that would be required by a user with the Drop Down Menu Program. The user may configure the modifications or the user may operate using default settings. Five modifications are provided: pointer-over, pointer-over-with-highlighting, pointer-over-with-clicking, pointer-over-with highlighting-and-clicking, and pointer-movement. The five modifications provide for auto-detection, auto-determination, and auto-execution thereby eliminating one or more manual movements by a user. Each of the five modifications can be applied in the areas of activation, selection, scrolling and sorting.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a flowchart of the logic of the Sort Program (SP);

FIG. 15 is a flow chart for the operation modification process;

FIG. 16 depicts a configuration table; and

FIG. 17 is an illustration of an embodiment of a graphical user interface for Operation Modification Program (OMP).

DETAILED DESCRIPTION OF THE PREFERRED EMBODIMENT

Figure 1:
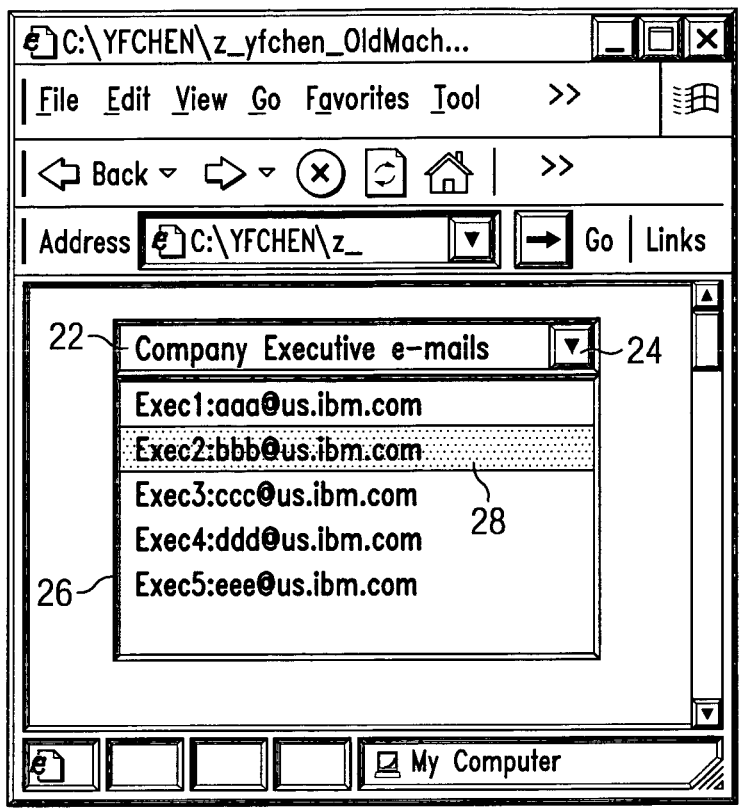
FIG. 1 is an illustration of a prior art drop down menu in which all of the menu items are displayed on the menu screen.
Figure 2:
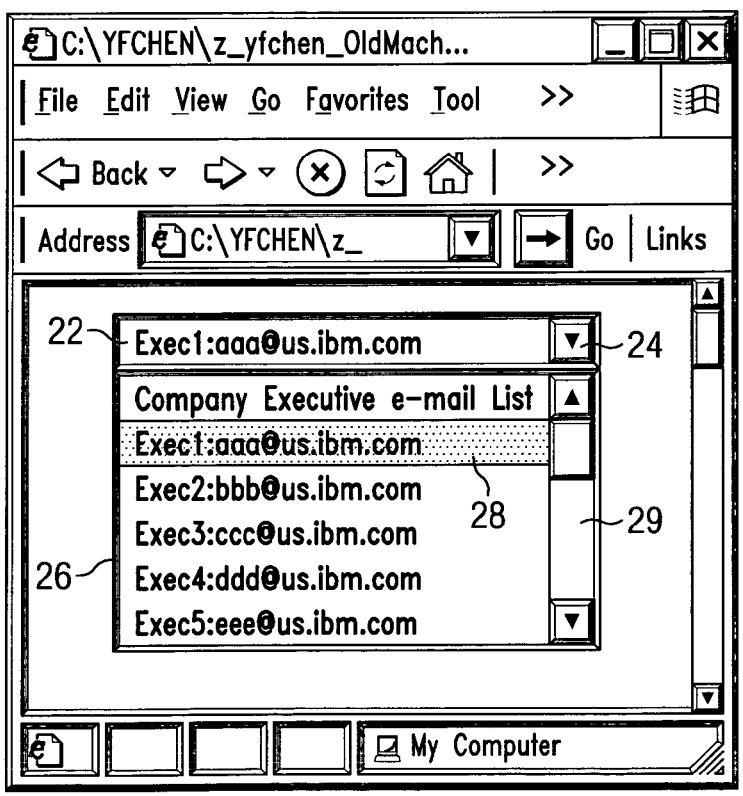
FIG. 2 is an illustration of a prior art drop down menu containing a scroll bar in which a limited number of menu items are displayed on the menu screen.
Figure 3:
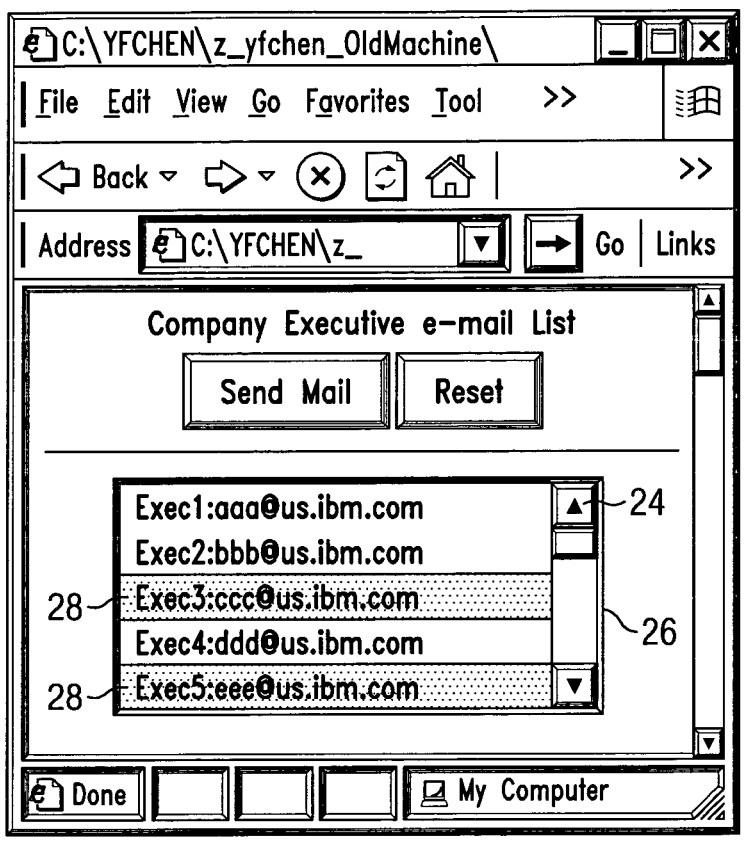
FIG. 3 is an illustration of a prior art menu containing a scroll bar in which a plurality of menu items have been selected.
Figure 4:
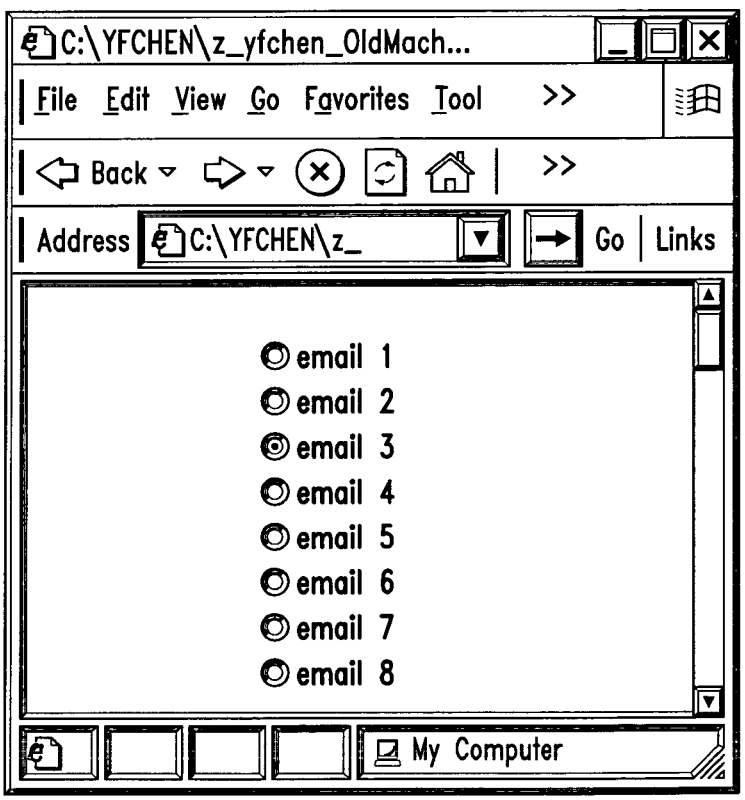
FIG. 4 is an illustration of a prior art menu with radio buttons.
Figure 5:
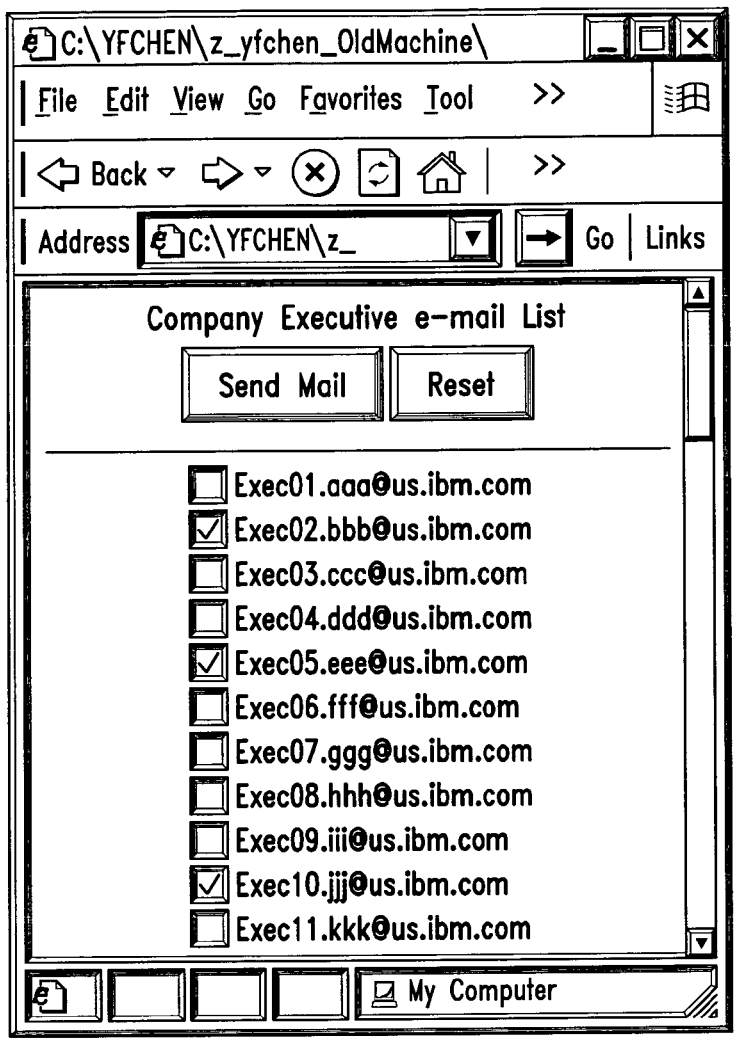
FIG. 5 is an illustration of a prior art menu with check boxes.

As used herein the term "activate" shall mean any method of causing a button on a display to perform a specified function, including, without limitation, clicking on the button with a user input device, moving a pointer over a button without clicking on the button, or touching the image of the button on the display screen with a human hand or object, and may also mean any method of causing a menu item on a display to be selected including, without limitation, clicking on the menu item with a user input device, moving a pointer over an item without clicking the menu item, or touching the image of the menu item on the display screen with a human hand or object.

As used herein the term "button" shall mean any graphic element in a display that may be activated and that upon activation causes a specified function to be performed.

As used herein the term "close" shall mean hiding a complete list of menu items.

As used herein the term "computer" shall mean a machine having a processor, a random access memory, a memory, a display, and an operating system, capable of interaction with a user or other computer, and shall include without limitation desktop computers, notebook computers, personal digital assistants (PDAs), handheld computers, and similar devices.

As used herein the term "device button" refers to a physical button on a user input device, including without limitation any keyboard key and any button on a mouse or trackball.

As used herein the term "display" means any visual depiction of a web page or computer program's graphical user interface (GUI) that appears on the visual output device of a computer including without limitation all graphic elements appearing on the visual output device.

As used herein the term "drop down menu" shall mean a list of one or more items that opens and closes in response to interaction with a button on a display.

As used herein the term "graphic element" shall include without limitation graphic characters, graphics characters and objects.

As used herein the term "highlight" shall mean calling attention to one or more displayed characters by altering the appearance of the displayed characters in response to a user interaction.

As used herein the term "mode" shall mean a programmed method of responding to a pointer operation.

As used herein the term "open" shall mean displaying a complete list of menu items.

As used herein the term "pointer" means any symbol rendered on a user output device used to point to graphic elements on the user output device.

As used herein the term "pointing device" means any user input device that can control a pointer, including without limitation a mouse; trackball, stylus, and touchpad.

As used herein the term "pointing operation" includes without limitation activating a button, selecting any text or menu item, scrolling through a drop down menu, sorting items in a drop down menu, and recalling menu items.

As used herein the term "pointer-over" (PO) means that a "pointing operation" occurs when any portion of a pointer is over any portion of a button, text, or menu item.

As used herein, the term "pointer-over-with-highlighting" (POH) means that a pointing operation occurs when any portion of a pointer is over any portion of a button, text, or menu item and that the button, text, or menu item is automatically highlighted.

As used herein, the term "pointer-over-with-clicking" (POC) means that a pointing operation occurs when any portion of a pointer is over any portion of a button, text, or menu item, and that clicking of the pointer device by the user will perform additional functions according to the configuration for activating, sorting, selecting or scrolling.

As used herein, the term "pointer-over-with highlighting-and-clicking" (POHC) means that a pointing operation occurs when any portion of a pointer is over any portion of a button, text, or menu item, that the button, text or menu item is automatically highlighted, and that clicking of the pointer device by the user will perform additional functions according to the configuration for activating, sorting, selecting or scrolling.

As used herein, the term "pointer-movement" (PM) means that a pointing operation occurs in response to a pre-configured directional movement of the pointer or a pre-configured movement of the pointer to a boundary of a screen, window, or drop down window.

As used herein the term "recall list" shall mean a group of menu items that are selected or displayed responsive to a recall program.

As used herein, the term "user input device" shall mean a keyboard, mouse, trackball, touchpad, touchpoint device, stylus pen, touch screen, or any other type of device used to input data into a computer.

As used herein the term "user interaction" shall mean activating a button or menu item.

Figure 6:
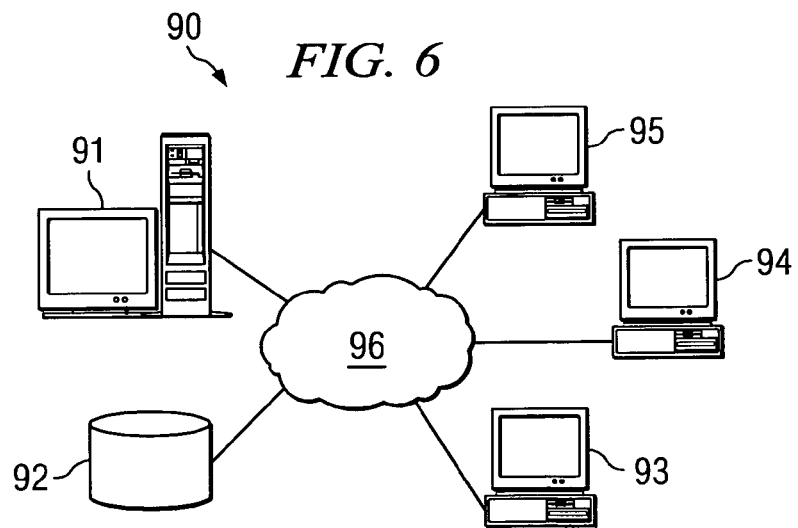
FIG. 6 is an illustration of a computer network used to implement the Drop Down Menu Program.

The internal configuration of a computer, including connection and orientation of the processor, memory, and input/output devices, is well known in the art. The present invention is a methodology that can be embodied in a computer program. FIG. 6 is an illustration of computer network 90 associated with the present invention. Computer network 90 comprises local machine 95 electrically coupled to network 96. Local machine 95 is electrically coupled to remote machine 94 and remote machine 93 via network 96. Local machine 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 6 is intended as a representation of all possible operating systems that may contain the present invention and is not meant as an architectural limitation.

Figure 7:
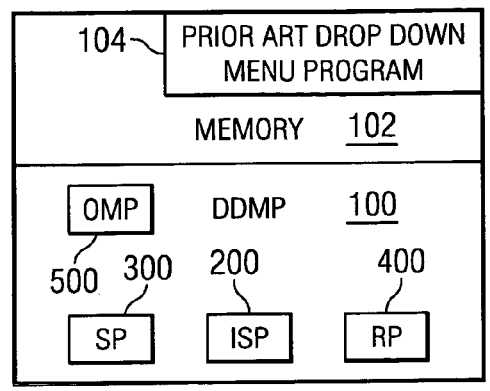
FIG. 7 is an illustration of a computer memory containing the Drop Down Menu Program.

FIG. 7 depicts Drop Down Menu Program (DDMP) 100. DDMP 100 comprises Item Selection Program (ISP) 200, Sort Program (SP) 300, and Recall Program (RP) 400. FIG. 7 also depicts optional component Operation Modification Program 500 (OMP). DDMP 100, ISP 200, SP 300, RP 400, and OMP 500 described herein can be stored within the memory of a computer on the network. Alternatively, DDMP 100, ISP 200, SP 300, RP 400, and OMP 500 can be stored in an external storage device such as a removable disk or a CD-ROM. Memory 102 is illustrative of the memory within the computer. The memory 102 also contains the Prior Art Drop Down Menu Program (PADDMP) 104. PADDMP 104 is a computer program which creates the prior art drop down menu. The present invention described herein is an improvement on the prior art drop down menu. Consequently, the present invention interfaces with the PADDMP 104 through memory 102. As part of the present invention, the memory 102 can be configured with DDMP 100, ISP 200, SP 300, RP 400, and/or OMP 500.

In alternative embodiments, DDMP 100, ISP 200, SP 300, RP 400, and/or OMP 500 can be stored in the memory of other computers. This configuration allows the processor workload to be distributed across a plurality of processors instead of a single processor. Further configurations of DDMP 100, ISP 200, SP 300, RP 400, and/or OMP 500 across various memories are known by persons skilled in the art.

Figure 8:
FIG. 8 is a flowchart of the logic of the Item Selection Program (ISP)

FIG. 8 depicts Item Selection Program (ISP) 200. ISP 200 is best understood when viewed in conjunction with the drop down menu illustrated in FIG. 9. ISP 200 starts (202) and makes a determination whether the user has activated the down button (204). The default method of activating the down button is pressing and releasing a pointing device button while the pointer is over the down button. But, as discussed in more detail below, the user may modify the activation method with OMP 500. If the user has not activated the down button, then ISP 200 makes a determination whether the drop down menu is already opened (206). If the drop down menu is not already opened, ISP 200 returns to step 204. If at step 206 the drop down menu is opened, then ISP 200 makes a determination whether the user has activated a menu item (208). The default method of activating a menu item is pressing and releasing a pointing device button while the pointer is over the menu item. But, as discussed in more detail below, the user may modify the activation method with OMP 500. If the user has not activated a menu item, ISP 200 returns to step 204. If at step 208 the user has activated a menu item, then ISP 200 makes a determination whether the activated menu item is already highlighted (210). If the menu item is not highlighted, then ISP 200 highlights the menu item (214) and returns to step 204. If at step 210 the menu item is already highlighted, then ISP 200 removes the highlighting from the menu item (212) and returns to step 204.

If at step 204 the user has activated the down button, then ISP 200 makes a determination whether the drop down menu program is already opened (216). If the drop down menu is not already opened, then ISP 200 opens the drop down menu (218) and returns to step 204. If at step 216 the drop down menu is already opened, then ISP 200 closes the drop down menu (220) and ends (222).

Figure 9:
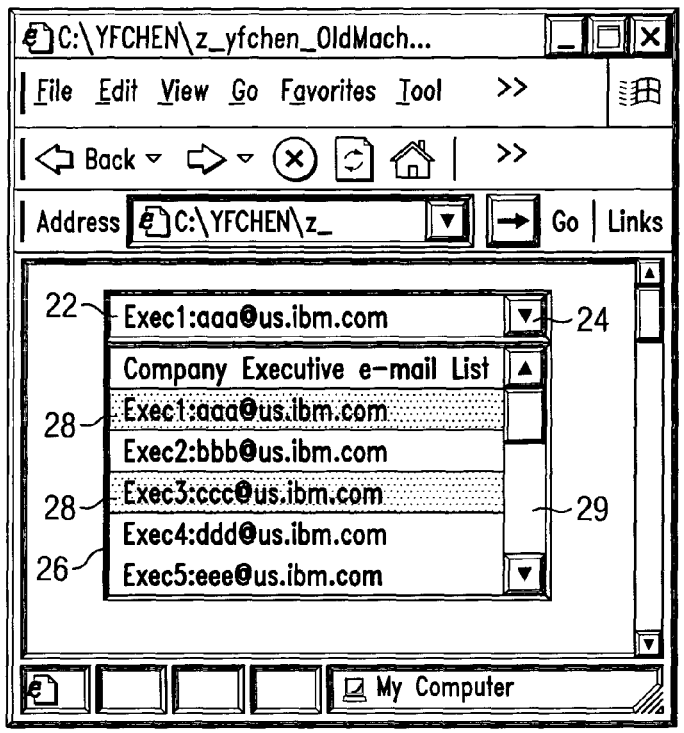
FIG. 9 is an illustration of the graphical user interface containing a drop down menu created by the ISP.

FIG. 9 is an illustration of the drop down menu created by ISP 200. The drop down menu in FIG. 9 operates similarly to a check box menu in that the user does not have to hold down the shift key or the control key when making multiple selections from the menu. Instead, as discussed in steps 208 through 214 of ISP 200, the user activates each menu item that the user desires to select, and ISP 200 highlights the desired menu item 28. If the user activates highlighted menu item 28, then ISP 200 removes the highlighting. The user may open and close the menu 26 using the down button 24. The user may also scroll through the menu using scroll bar 29 and view selected choices in dialogue box 22.

FIG. 10 depicts Sorting Program (SP) 300. SP 300 is best understood when viewed in conjunction with the drop down menu illustrated in FIGS. 11A, 11B, and 11C. SP 300 starts (302) and makes a determination whether a user has activated the dialogue box, the down button, or either of the sort buttons (304). The default method of activating the dialogue box, the down button, or either sort button is pressing and releasing a pointing device button while the pointer is over the respective graphic element. But, as discussed in more detail below, the user may modify the activation method with OMP 500. If user has not activated the dialogue box, the down button, or either of the sort buttons, then SP 300 returns to step 304. If at step 304 a user has activated the dialogue box, the down button, or either of the sort buttons, then SP 300 opens the drop down menu (306). SP 300 then sorts the menu items by the frequency of their use (See FIG. 11A) (308). In other words, SP 300 places the most frequently selected menu items at the top of the menu, the next most frequently selected menu item second on the menu, and so forth. The prior user selections from the drop down menus are stored in the PADDMP 104 or in the cache memory. SP 300 accesses the prior art selection data to determine the frequency of use. Alternatively, the menu items may appear in their default order as specified by the web designer or computer programmer. The user may also use OMP 500 to cause the menu items to appear in their default order.

SP 300 then makes a determination whether the user has activated the sort ascending button (310). The default method of activating a sort ascending button is pressing and releasing a pointing device button while the pointer is over the sort ascending button. But, as discussed in more detail below, the user may modify the activation method with OMP 500. If the user has activated the sort ascending button, then SP 300 sorts the menu items in alphabetically, numerically, or chronologically ascending order (See FIG. 11B) (312) and returns to step 304. If at step 310 the user has not activated the sort ascending button, then SP 300 makes a determination whether the user has activated the sort descending button (314). The default method of activating a sort descending button is pressing and releasing a pointing device button while the pointer is over the sort descending button. But, as discussed in more detail below, the user may modify the activation method with OMP 500. If the user has activated the sort descending button, then SP 300 sorts the menu items in alphabetically, numerically, or chronologically descending order (See FIG. 11C) (316) and returns to step 304. If at step 314 the user has not activated the sort descending button, then SP 300 makes a determination whether the user has activated the down button (318). If the user has not activated the down button, then SP 300 returns to step 304. If at step 318 the user has activated the down button, then SP 300 closes the drop down menu (320) and ends (322).

Figure 11A:
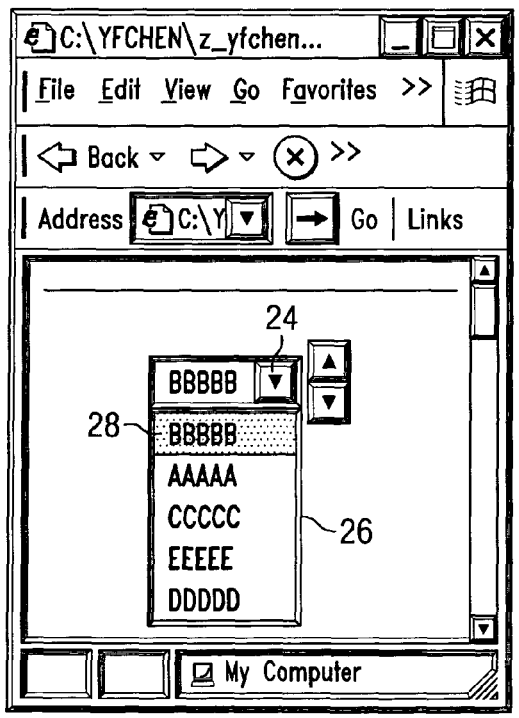
FIG. 11A is an illustration of the graphical user interface containing a drop down menu created by the SP with the menu items sorted according to the frequency of use.
Figure 11B:
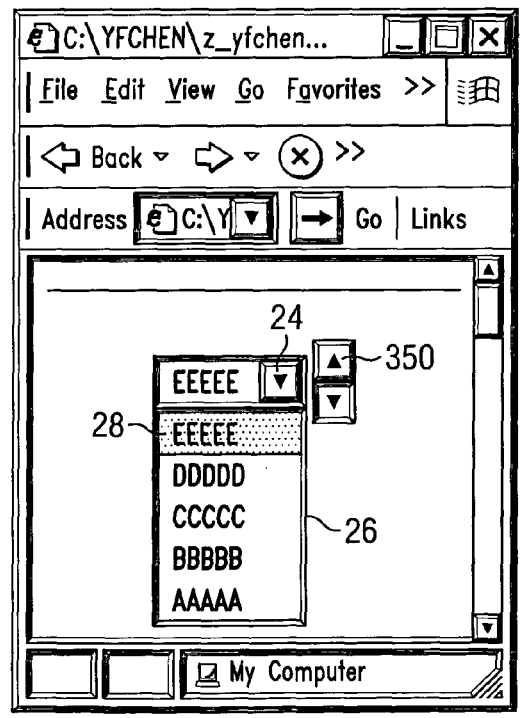
FIG. 11B is an illustration of the graphical user interface containing a drop down menu created by the SP with the menu items sorted in ascending order.
Figure 11C:
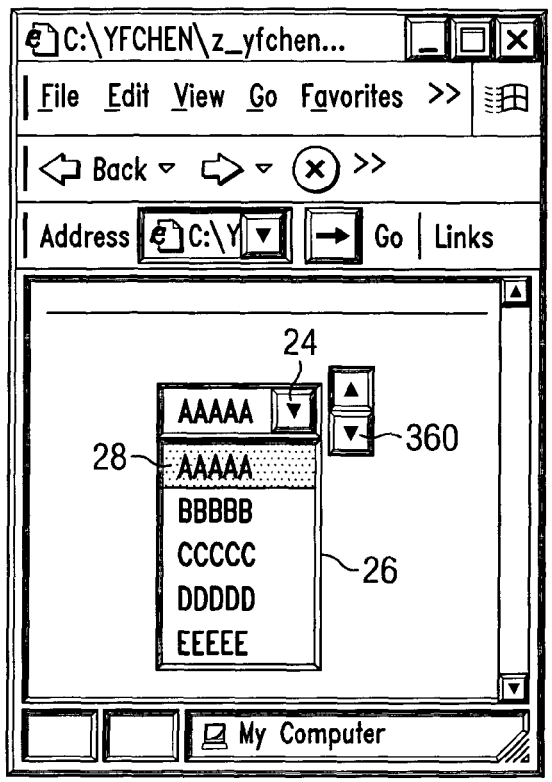
FIG. 11C is an illustration of the graphical user interface containing a drop down menu created by the SP with the menu items sorted in descending order.

FIGS. 11A, 11B, and 11C are illustrations of the drop down menu created by SP 300. FIG. 11A shows the drop down menu with the menu items sorted according to the frequency of use (i.e. from most frequently used to least frequently used, the menu items are BBBBB, AAAAA, CCCCC, EEEEE, and DDDDD). As discussed in conjunction with step 308 in SP 300, frequency sorting occurs when the user activates the down button 24 to open the menu 26. The selected menu item 28 is also displayed.

FIG. 11B shows the drop down menu with the menu items sorted in ascending order. As discussed in conjunction with step 312 in SP 300, sorting in ascending order occurs when the user activates the sort ascending button 350. Activating sort ascending button 350 causes menu 26 to open automatically. Selected menu item 28 is also displayed.

FIG. 11C shows the drop down menu with the menu items sorted in descending order. As discussed in conjunction with step 314 in SP 300, sorting in descending order occurs when the user activates sort descending button 360. Activating sort descending button 360 causes menu 26 to open automatically. The selected menu item 28 is also displayed.

Figure 12:
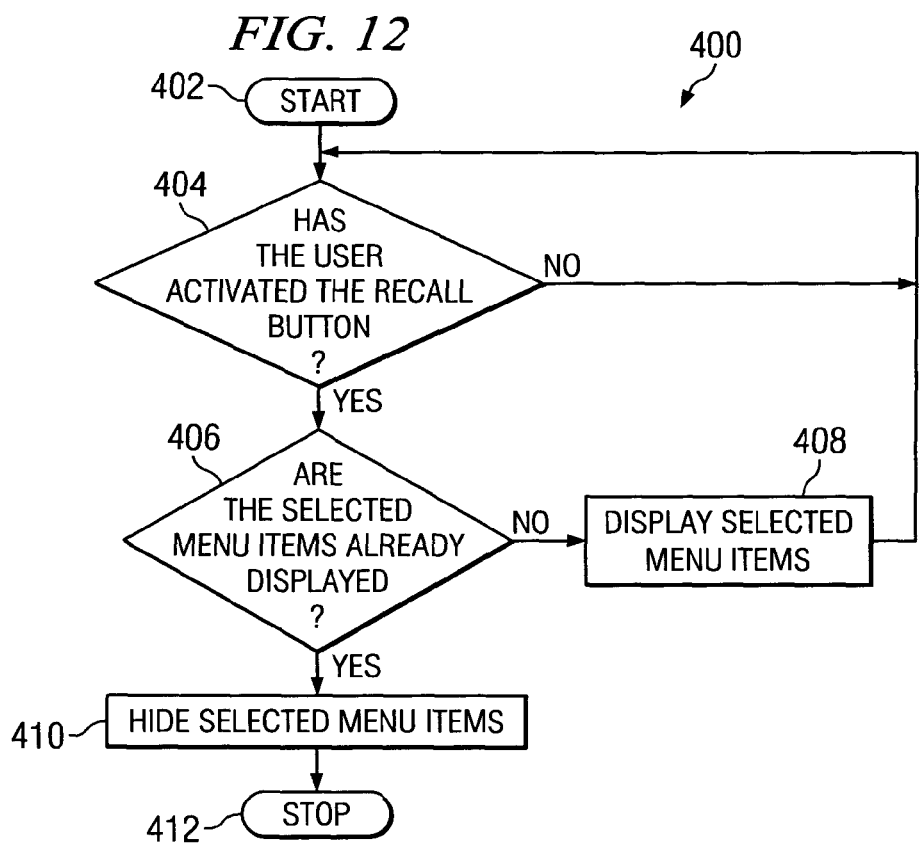
FIG. 12 is a flowchart of the logic of the Recall Program (RP)

FIG. 12 depicts a flowchart of Recall Program (RP) 400. RP 400 is best understood when viewed in conjunction with the drop down menu illustrated in FIG. 13. RP 400 starts (402) and makes a determination if the user has activated the recall button (See FIG. 13) (404). The default method of activating a recall button is pressing and releasing a pointing device button while the pointer is over the recall button. But, as discussed in more detail below, the user may modify the activation method with OMP 500. If the user has not activated the recall button, then RP 400 returns to step 404. If at step 404 the user has activated the recall button, then RP 400 makes a determination whether the selected menu items are already displayed (406). If the selected menu items are not already displayed, then RP 400 displays the selected menu items (408) and returns to step 404. If at step 406 the selected menu items are already displayed, RP 400 hides the selected menu items (410) and stops (412).

In an alternative embodiment, the user can simply position the pointer over the recall button, the menu items, or the down button to activate them. In further alternative embodiments, the drop down menu may contain configurable options such as toggling the recall list to display unselected items from the drop down menu. Additionally, in the alternative embodiment, the selected and unselected menu items can be represented by small icons such as a checkbox or an "x". Furthermore, if the user has previously used the drop down menu to make selections, another option is to display previously selected or unselected items form memory.

Figure 13:
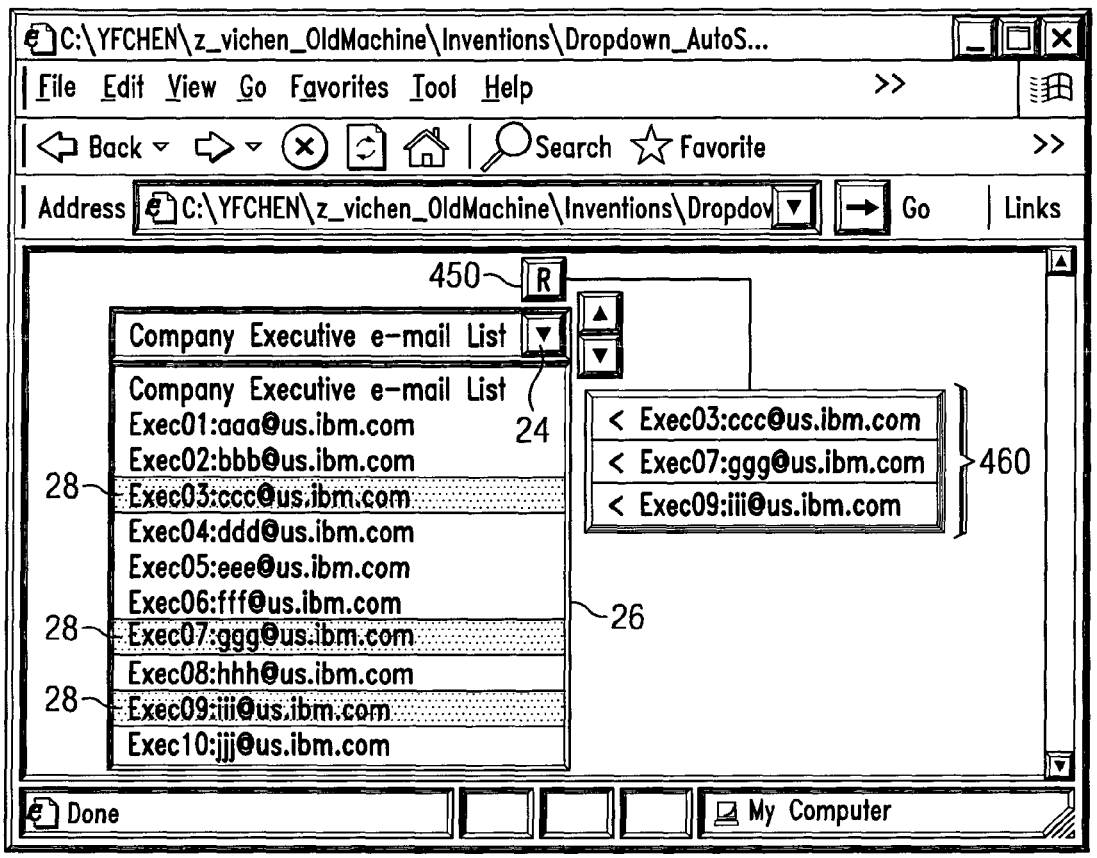
FIG. 13 is an illustration of the graphical user interface containing a drop down menu created by the RP with recall items displayed outside of the menu.

FIG. 13 is an illustration of the graphical user interface containing a drop down menu created by RP 400. As discussed in steps 406 though 410, when the user activates recall button 450 in RP 400, selected menu items 28 from menu 26 are displayed on recall list 460. Recall list 460 can be displayed using Hypertext Markup Language (HTML) or layered windows so that it does not use additional space on the web page. Both HTML and layering windows are well known in the art. The user can make recall list disappear by activating recall button 450 again. The user may also open and close menu 26 with down button 24 independent of making recall list 460 appear and disappear.

Figure 14:
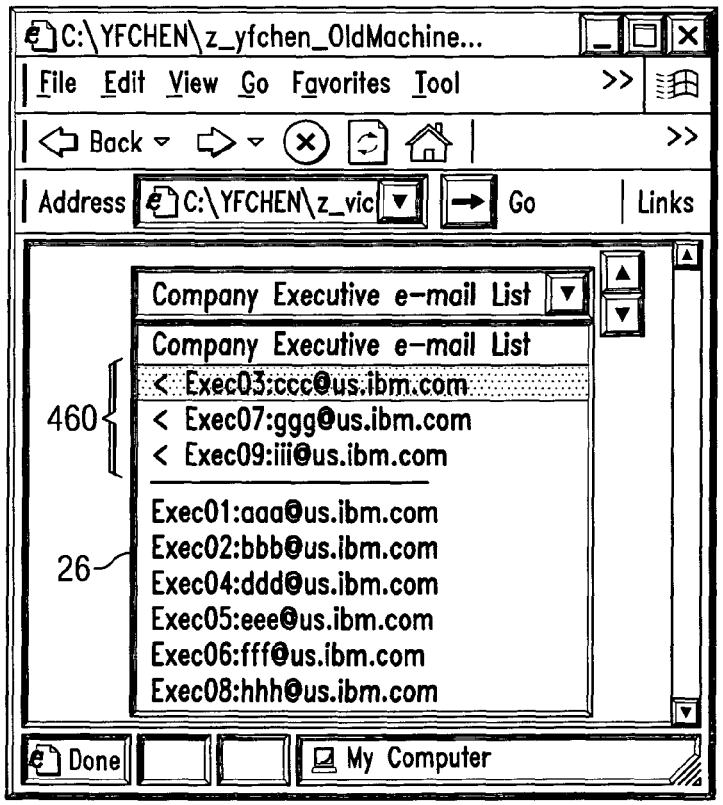
FIG. 14 is an alternative embodiment illustration of the graphical user interface containing a drop down created by the RP with recall items displayed within the menu.

FIG. 14 illustrates an alternative embodiment of the graphical user interface containing a drop down menu created by RP 400. In this alternative embodiment, there is no recall button. Instead, recall list 460 appears as part of menu 26. When the user activates one of the menu items, the selected item is automatically moved up to the recall list 460. Thus, the recall list 460 contains all of the selected items and the remainder of menu 26 contains all of the unselected items.

In another alternative embodiment of RP 400, the user can revise the selected menu items directly on the recall list. In the present alternative embodiment, the user opens the recall list and activates the menu items he desires to delete. The deleted items are then removed from the recall list. The present alternative embodiment can be implemented in conjunction with any of the embodiments described above.

Operation Modification Program (OMP) 500 enables a user to alter the pointing device functions in any embodiment of DDMP 100. OMP 500 comprises a configuration table, a configuration processor, and a configuration editor.

FIG. 15 illustrates the operation of configuration processor 1500, in conjunction with configuration table 1501. Configuration processor 1500 continuously monitors configuration table 1501 for changes. If configuration table 1501 has changed (1502), configuration processor 1500 alerts DDMP 100 (1504). DDMP 100 is then able to respond to user input according to configuration table 1501. A person of skill in the art will appreciate that configuration table 1501 could be implemented in many different forms, including simple flat-file databases. Flat-file databases are well-known in the art and need not be described in great detail herein.

FIG. 16 is an example of a flat-file implementation of configuration table 1501, and the type of data that it might contain. In FIG. 16, each row in the first column contains a pointing operation. The second column contains a user-selected operation mode for each pointing operation in the first column. The pointing operations to which OMP 500 can be applied include activating, selecting, scrolling, sorting, and recalling operations. Available operation modes include pointer-over, pointer-over-with-clicking, pointer-movement, pointer-over-with-highlighting, and pointer-over-with-highlighting-and-clicking. The table 1 provides examples of how each operation mode might affect each pointing operation. Table 1 is provided for illustration purposes only, and is not intended to limit the scope of the invention in any way. A person of skill in the art will appreciate that many different effects could be implemented.

TABLE 1

| | | |
|---|---|---|
| Activating | pointer-over (PO) | Passing pointer over a button activates the button. Passing pointer over a scroll bar image in an upward direction will open the menu. Passing pointer over an up/down arrow will open/close a drop down menu, and the next time the cursor passes over the up/down arrow, the drop down menu will close/open. |
| | pointer-over-with-highlighting (POH) | Passing pointer over a button highlights the button and activates the button. |
| | pointer-over-with-clicking (POC) | Passing pointer over a button and clicking activates the button. |
| | pointer-over-with-highlighting-and-clicking (POHC) | Passing pointer over a button highlights the button and clicking activates the button. |
| | pointer-movement (PM) | Movement of pointer to top of screen, bottom of screen, right side, left side, top right corner, top left corner, bottom right corner, and bottom left corner can be programmed to activate functions. |
| Selecting | PO | Passing pointer over an item in a drop down menu list will select the item. If the pointer is moved from one item to the next, the next item will also be selected. Other items are selected by moving the pointer off the list before moving the pointer to a different item on the list. Passing pointer over an already selected item will de-select the item. |
| | POH | Passing pointer over an item in a drop down menu list will highlight and select the item. If the pointer is moved from one item to the next, the next item will also be selected. Other items are selected by moving the pointer off the list before moving the pointer to a different item on the list. Passing pointer over an already selected item will de-select the item. |
| | POC | Passing pointer over an item in a drop down menu selects the item when the button is depressed. The pointer can be moved to another item without releasing the button so that the second item is selected when the button is released. |

TABLE 1-continued

| | | |
|---|---|---|
| | POHC | Pointer over item in a drop down menu highlights and selects the item. Movement of pointer over another item automatically selects the item. To avoid selection, move the pointer with the button depressed. |
| Scrolling | PO | Moving pointer over a scroll bar image in an upward direction will cause the menu to scroll upward. Moving pointer over a scroll bar image in a downward direction will cause the menu to scroll downward. If there exist both up and down arrows, then passing pointer over the up arrow will cause the menu to scroll upward, and over the down arrow to scroll downward. |
| | POH | Passing pointer over a scroll bar image will highlight the image. Any subsequent movement in an upward direction or a downward direction will cause the menu to scroll up or down, respectively. |
| | POC | Clicking a scroll bar image and moving the pointer in an up or down direction will cause the menu to scroll up or down, respectively. Double-clicking or moving the pointer to the right or left will cause the menu to scroll to the top or bottom of the list. |
| | POHC | Clicking a scroll bar image highlights the image. Subsequently moving the pointer in an up or down direction will cause the menu to scroll up or down, respectively. Double-clicking or moving the pointer to the right or left will cause the menu to scroll to the top or bottom of the list. |
| Sorting | PO | Passing pointer over upper a boundary, border, or corner of a drop down menu list will cause the list to sort in ascending order. Passing pointer over a bottom boundary, border, or corner will cause the list to sort in descending order. A subsequent movement towards the boundary, border, or corner will update the list to its original sequence. |
| | POH | Passing pointer over an up arrow image will highlight the image and cause the list to sort in ascending order. Passing pointer over a down arrow image will highlight the image and cause the list to sort in descending order. Passing pointer over upper boundary, border, or corner of a drop down menu list will highlight the boundary/border/corner and cause the list to sort in ascending order. Passing pointer over bottom boundary/border/corner will highlight the boundary, border, or corner and cause the list to sort in descending order. A subsequent movement towards the boundary, border, or corner will update the list to its original sequence. |
| | POC | Passing pointer over up arrow image with button depressed will sort entries in the list in ascending order. When button is released, entries will revert to original order. Passing pointer over a down arrow image with button depressed will sort entries in the list in descending order. When button is released, entries will revert to original order. Passing pointer over top boundary/border/corner with button depressed will cause the list to sort ascending. |

TABLE 1-continued

| | |
|---|---|
| | When button is released, entries will revert to original order. Passing pointer over bottom boundary, border, or corner with button depressed will cause the list to sort descending. When button is released, entries will revert to original order. |
| POHC | Passing pointer over up arrow image with button depressed will highlight image and sort entries in the list in ascending order. When button is released, entries will revert to original order. Passing pointer over a down arrow image with button depressed will highlight image and sort entries in the list in descending order. When button is released, entries will revert to original order. Passing pointer over top boundary, border, or corner with button depressed will highlight the boundary, border, or corner and cause the list to sort ascending. When button is released, entries will revert to original order. Passing pointer over bottom boundary, border, or corner with button depressed will highlight boundary, border or corner and cause the list to sort descending. When button is released, entries will revert to original order. |
| PM | Moving pointer in an up direction over a drop down menu list will cause the list to sort in ascending order. Moving pointer in a down direction over a drop down menu list will cause the list to sort in descending order. |

A configuration editor provides a convenient mechanism for users to modify configuration table 1501. A user could modify configuration table 1501 in many different ways and each pointing operation can be set to an independent operation mode. A person of skill in the art will appreciate that a configuration editor could be implemented in many different forms. For example, in the context of a web browser, a configuration editor could be integrated into a browser or it could be distributed as an after-market component, generally known as a plug-in component. Furthermore, OMP 500 could be applied to graphic elements other than DDMP 100, such as radio buttons and check boxes.

FIG. 17 illustrates one embodiment of a configuration editor. Configuration editor 1700 comprises a collection of operation control panels (OCP) 1702 and mode indicators 1704. Each OCP 1702 corresponds to a pointer operation in configuration table 1501. Similarly, each mode indicator 1704 corresponds to a specific operation mode. A user can select an operation mode for each pointing operation in configuration table 1501 by selecting the appropriate mode indicator on the corresponding OCP 1702. While FIG. 17 illustrates one embodiment of a configuration editor, it is provided for illustration only and is not intended to limit the scope of the invention in any way. A person of skill in the art will appreciate the large number of variations that are possible. Moreover, a person of skill in the art will understand that a user may choose to use the OMP 500 with pre-configured default settings rather than employing configuration editor 1700.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A programmable apparatus for modifying a drop down menu program, comprising:
a computer having a memory, the memory containing a drop down menu program, a configuration table, and a configuration processor;
wherein the drop down menu program displays menu items in a drop down menu and is modified in accordance with the configuration table to eliminate one or more manual movements required by a user when employing a user input device for activating a button on the drop down menu, selecting any text or menu item on the drop down menu, scrolling through the drop down menu, or sorting items in the drop down menu;
wherein the configuration table comprises a plurality of pointer operations and a plurality of user selectable operation modes that correspond to the plurality of pointer operations;
wherein a first pointer operation is a pointer-over operation and wherein a first selectable operation mode corresponding to the first pointer operation is activating a menu button; and
wherein the configuration processor detects a change in the configuration table in response to a user selection of a selectable mode and distributes the change to the drop down menu program;
wherein, responsive to the first pointer operation, when a user moves a pointer over the menu button on the drop down menu the menu button on the drop down menu is activated without any other user action.

2. The programmable apparatus of claim 1 wherein the configuration table has an activating operation.

3. The programmable apparatus of claim 1 wherein the configuration table has a selecting operation.

4. The programmable apparatus of claim 1 wherein the configuration table has a scrolling operation.

5. The programmable apparatus of claim 1 wherein the configuration table has a sorting operation.

6. The programmable apparatus of claim 1 wherein the configuration table has a recalling operation.

7. The programmable apparatus of claim 1 wherein the selectable mode is a pointer-over-with-clicking mode.

8. The programmable apparatus of claim 1 wherein the selectable mode is a pointer-movement mode.

9. The programmable apparatus of claim 1 wherein the selectable mode is a pointer-over-with-highlighting mode.

10. The programmable apparatus of claim 1 wherein the selectable mode is a pointer-over-with-highlighting-and-clicking mode.

11. The programmable apparatus of claim 1 further comprising a configuration editor.

12. The programmable apparatus of claim 11 wherein the configuration editor is a graphical configuration editor.

13. The programmable apparatus of claim 12 wherein the configuration editor has at least one operation control panel, the operation control panel having a plurality of selectable mode indicators.

14. The programmable apparatus of claim 13 wherein the operation control panel is an activating control panel.

15. The programmable apparatus of claim 13 wherein the operation control panel is a selecting control panel.

16. The programmable apparatus of claim 13 wherein the operation control panel is a scrolling control panel.

17. The programmable apparatus of claim 13 wherein the operation control panel is a sorting control panel.

18. The programmable apparatus of claim 13 wherein the operation control panel is a recalling control panel.

19. A program product operable on a computer, the program product comprising:
- a computer-usable medium;
- a drop down menu program for the display of menu items in a drop down menu wherein the drop down menu program, in accordance with a configuration table, eliminates one or more manual movements required by a user when employing a user input device for activating a button on the drop down menu, selecting a text or menu item on the drop down menu, scrolling through the drop down menu, or sorting a plurality of items in the drop down menu, the drop down, and wherein the drop down menu program, the configuration table and a configuration processor are stored in the computer-usable medium;
- wherein the configuration table comprises a plurality of pointer operations and a plurality of user selectable operation modes that correspond to the plurality of pointer operations;
- wherein a first pointer operation is pointer-over and wherein a first selectable operation mode corresponding to the first pointer operation is activating a menu button; and
- wherein the computer-usable medium, so configured by the configuration processor, causes a computer to detect a change in the configuration table in response to a selection of an operation mode by a user and to distribute the change to the drop down menu program; and
- wherein, responsive to the first pointer operation, when a user moves a pointer over the menu button on the drop down menu the menu button on the drop down menu is activated without any other user action.

20. The program product of claim 19 wherein the configuration table has an activating operation.

21. The program product of claim 19 wherein the configuration table has a selecting operation.

22. The program product of claim 19 wherein the configuration table has a scrolling operation.

23. The program product of claim 19 wherein the configuration table has a sorting operation.

24. The program product of claim 19 wherein the configuration table has a recalling operation.

25. The program product of claim 19 wherein the operation mode is a pointer-over-with-clicking mode.

26. The program product of claim 19 wherein the operation mode is a pointer-movement mode.

27. The program product of claim 19 wherein the operation mode is a pointer-over-with-highlighting mode.

28. The program product of claim 19 wherein the operation mode is a pointer-over-with-highlighting-and-clicking mode.

29. The program product of claim 19 further comprising a configuration editor stored in the computer-usable medium.

30. The program product of claim 29 wherein the configuration editor is a graphical configuration editor.

31. The program product of claim 30 wherein the configuration editor has at least one operation control panel, the operation control panel having a plurality of selectable mode indicators.

32. The program product of claim 31 wherein the operation control panel is an activating control panel.

33. The program product of claim 31 wherein the operation control panel is a selecting control panel.

34. The program product of claim 31 wherein the operation control panel is a scrolling control panel.

35. The program product of claim 31 wherein the operation control panel is a sorting control panel.

36. The program product of claim 31 wherein the operation control panel is a recalling control panel.

\* \* \* \* \*